United States Patent
Akdeniz et al.

(10) Patent No.: US 10,887,792 B2
(45) Date of Patent: Jan. 5, 2021

(54) PSEUDO-RANDOM LABEL ASSIGNMENTS FOR PACKETS IN A TRANSMISSION BURST

(71) Applicant: Intel Corporation, Santa Clara, CA (US)

(72) Inventors: Mustafa Akdeniz, San Jose, CA (US); Jing Zhu, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 35 days.

(21) Appl. No.: 16/233,704

(22) Filed: Dec. 27, 2018

(65) Prior Publication Data
US 2019/0174350 A1    Jun. 6, 2019

(51) Int. Cl.
*H04W 28/04* (2009.01)
*H04W 40/02* (2009.01)
*H04B 1/00* (2006.01)
*H04L 12/707* (2013.01)
*H04W 40/12* (2009.01)
*H04L 12/801* (2013.01)

(52) U.S. Cl.
CPC ............ *H04W 28/04* (2013.01); *H04B 1/00* (2013.01); *H04L 45/24* (2013.01); *H04L 47/34* (2013.01); *H04W 40/02* (2013.01); *H04W 40/12* (2013.01)

(58) Field of Classification Search
CPC ..... H04W 40/12; H04W 40/02; H04W 28/04; H04L 45/24; H04L 47/34
See application file for complete search history.

(56) References Cited

U.S. PATENT DOCUMENTS

| | | | | |
|---|---|---|---|---|
| 6,959,059 | B1 * | 10/2005 | Yamazaki | H04J 3/0602 375/224 |
| 2009/0180451 | A1 * | 7/2009 | Alpert | H04W 72/1215 370/338 |
| 2009/0213729 | A1 * | 8/2009 | Zhang | H04L 1/1607 370/216 |
| 2011/0317578 | A1 * | 12/2011 | Tomita | H04W 36/02 370/252 |
| 2015/0264645 | A1 * | 9/2015 | Virtej | H04W 76/28 370/311 |
| 2015/0282077 | A1 * | 10/2015 | Yavuz | H04W 52/0212 455/452.1 |
| 2018/0083736 | A1 * | 3/2018 | Manolakos | H04L 1/0071 |
| 2018/0270772 | A1 * | 9/2018 | Ly | H04W 72/005 |
| 2019/0285770 | A1 * | 9/2019 | Nyberg | G01V 99/00 |

* cited by examiner

*Primary Examiner* — Gbemileke J Onamuti
(74) *Attorney, Agent, or Firm* — Schwabe, Williamson & Wyatt, P.C.

(57) ABSTRACT

Embodiments described herein are generally directed to a sequence encoding engine to apply pseudo-random label assignments to packets within a single transmission burst. They may also include a modulation circuit coupled to the sequence encoding engine to modulate signals to burst transmit the packets. These burst transmissions may travel along a plurality of radio access pathways. In embodiments, the pseudo-random label assignments to the packets within the single transmission burst using a van der Corput sequence, or some other sequence for example a digit-reversed base-N representation of a packet sequence number, wherein N is a number of the selected ones of the plurality of radio access pathways, for example but not limited to a LTE or a Wi-Fi pathway.

24 Claims, 10 Drawing Sheets

PSEUDO-RANDOM LABEL ASSIGNMENTS FOR PACKETS IN A TRANSMISSION BURST

TECHNICAL FIELD

The present disclosure relates to the fields of computing and networking. In particular, the present disclosure is related to processes and apparatuses for assigning packet labels for burst transmissions over multiple pathways including radio access pathways.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

In communication networks, when transmitter sends packets to receiver, depending on the source of the packet, the quality of service (QoS) requirements of the packet, or the forwarding route of the packet, the transmitter may need to inform receiver about the sequence of future packets in advance in case of packet loss.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
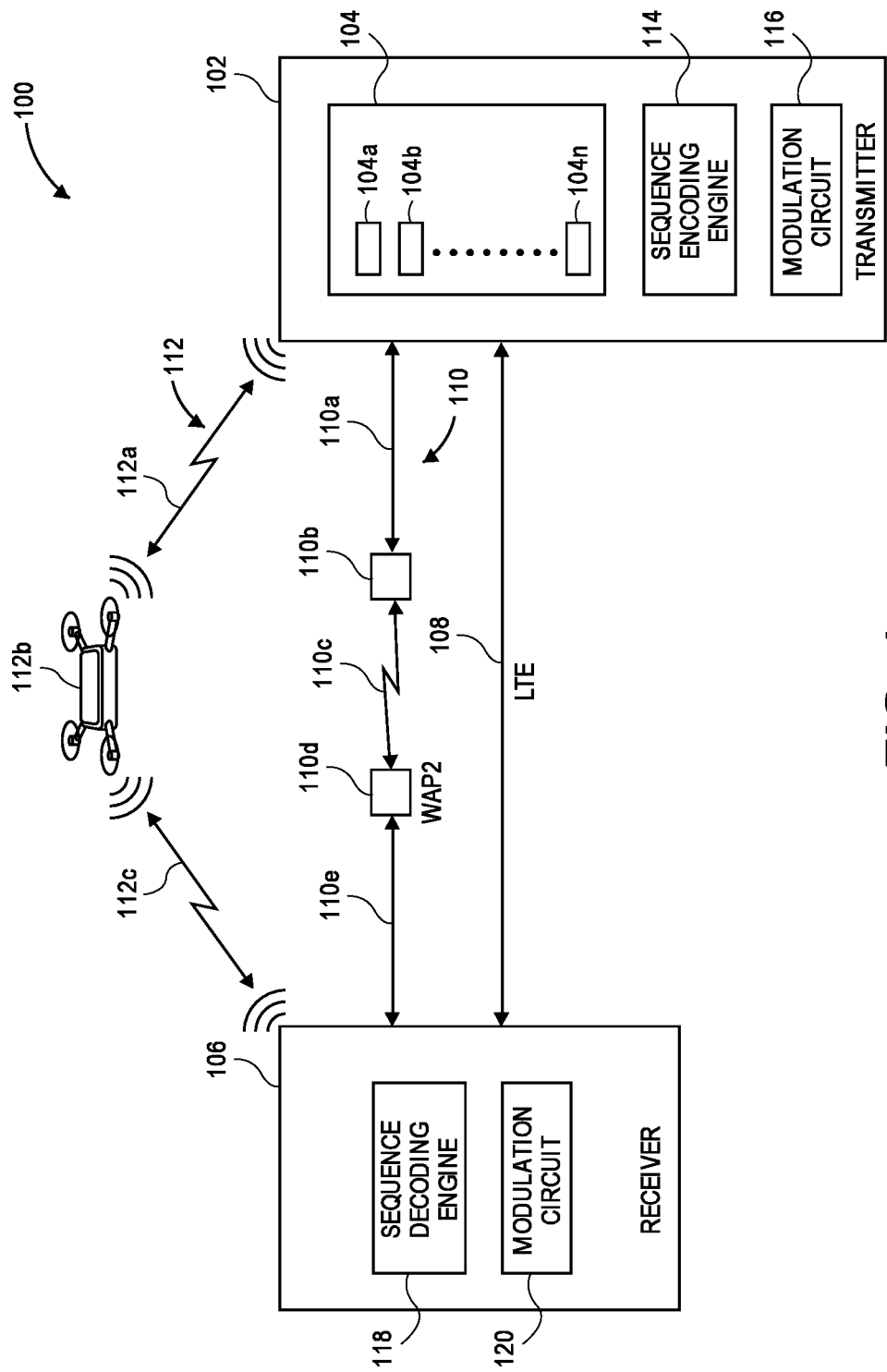
FIG. 1 illustrates an example of a burst of transmission from a transmitting device to a receiving device through multiple radio access pathways, in accordance with various embodiments.

Embodiments described herein are generally directed to a sequence encoding engine to apply pseudo-random label assignments to packets within a single transmission burst. They may also include a modulation circuit coupled to the sequence encoding engine to modulate signals to burst transmit the packets. These burst transmissions may travel along a plurality of radio access pathways. In embodiments, the pseudo-random label assignments for each packet within the single transmission burst may use a van der Corput sequence, or some other sequence. For example, a digit-reversed base-N representation of a packet sequence number, wherein N is a number of the selected ones of the plurality of radio access pathways. The radio access pathways may be, for example but not limited to, a LTE or a Wi-Fi pathway. The modulation circuit modulates signals to burst transmit the packets over selected ones of a plurality of radio access pathways, based at least in part on the pseudo-randomly assigned labels of the packets.

As an alternative to legacy implementations of sending individual labels of each future, or past, packet, a burst-labeling technique as described herein may be preferred in order to reduce overhead, especially when the size of the set of labels is much smaller than total number of packets to be sent.

In the case of multiple radio access pathway routing, where labels are the selection of the radio access pathway that each packet is forwarded over, legacy implementations may use the following labeling scheme. A transmitter may decide on a labelling configuration (i.e. a splitting ratio of packets to each label) to use for the next L packets. The transmitter then sends to the receiver the sequence number of packet that will be the first packet in the burst, the total number of packets that will be in the burst (L), and the total (or cumulative total) number of packets that will belong to each label. Then, the receiver will know the label for each packet that will arrive (or get lost) until the end of burst size and it will be able to take action even if a packet gets lost.

However, one of the main challenges in designing such a scheme is the selection of the burst size. For example, if the burst size is too low, then the set of available configurations (i.e. realizable splitting ratios) will be limited. If the burst size is too high, then it will take longer to realize the desired splitting ratio. For example, in the multiple radio access pathway routing case, a large burst size may cause the transmitter to send many packets over one radio access pathway for long time before switching to another radio access pathway. This might cause congestion and the transmitter may not be able to switch its scheduling configuration until it finishes sending all the packets in the burst size. If the transmitter does not wait for all the packets in burst ratio to be transmitted before changing its scheduling configuration, then there will be discrepancy between the desired splitting ratio and the actual splitting ratio.

Embodiments may address these issues by applying pseudo-random label assignment to the packets in a single burst in order to decrease the discrepancy of split ratio, which will relax the upper limit for selection of the burst size. For example, a van der Corput sequence may be used to determine a pseudo-random label assignment to the packets to reduce the discrepancy. Thus, when deciding on a label, instead of sequencing packets with respect to their sequence numbers, labels will be given to the packets based upon a van der Corput sequence. In embodiments, other sequences may be used.

In embodiments, various algorithms may be used to determine the portion of the packets to be forwarded over each pathway this may also be referred to as splitting ratios. Once the resulting splitting ratio is applied, the communication system responds to the decision in forms of overall packet delay, goodput, or congestion level. Having low discrepancy in applying the desired split ratio will make the system and network infrastructure more responsive to the labeling scheme. For the multiple radio access pathway case, this technique may also reduce congestion and latency. For multi-flow relaying or network slicing, embodiments may offer fair scheduling and better QoS.

In the following description, various aspects of the illustrative implementations are described using terms commonly employed by those skilled in the art to convey the substance of their work to others skilled in the art. However, it will be apparent to those skilled in the art that embodiments of the present disclosure may be practiced with only some of the described aspects. For purposes of explanation, specific numbers, materials, and configurations are set forth in order to provide a thorough understanding of the illustrative implementations. However, it will be apparent to one skilled in the art that embodiments of the present disclosure may be practiced without the specific details. In other instances, well-known features are omitted or simplified in order not to obscure the illustrative implementations.

In the following description, reference is made to the accompanying drawings that form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C).

The description may use perspective-based descriptions such as top/bottom, in/out, over/under, and the like. Such descriptions are merely used to facilitate the discussion and are not intended to restrict the application of embodiments described herein to any particular orientation.

The description may use the phrases "in an embodiment," or "in embodiments," which may each refer to one or more of the same or different embodiments. Furthermore, the terms "including," "having," and the like, as used with respect to embodiments of the present disclosure, are synonymous.

The terms "coupled with" and "coupled to" and the like may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. By way of example and not limitation, "coupled" may mean two or more elements or devices are coupled by electrical connections on a printed circuit board such as a motherboard, for example. By way of example and not limitation, "coupled" may mean two or more elements/devices cooperate and/or interact through one or more network linkages such as wired and/or wireless networks. By way of example and not limitation, a computing apparatus may include two or more computing devices "coupled" on a motherboard or by one or more network linkages.

The term "module" in general, "insertion module" in particular, may refer to, be part of, or include an Application Specific Integrated Circuit (ASIC), an electronic circuit, a combinatorial circuit, such as field programmable gate array (FPGA) programmed with the implementation logic, a processor (shared, dedicated, or group) and/or memory (shared, dedicated, or group) that execute one or more software or firmware programs with implementation logic, and/or other suitable components that provide the described functionality with references to FIGS. 1-6 below.

The term "computer-readable storage media" may refer to, be a part of, or otherwise include media on which data, including instructions of a module (e.g., the insertion module described below) that may be executed, may reside. Computer-readable storage media may be either transitory, or non-transitory.

Various operations are described as multiple discrete operations in turn, in a manner that is most helpful in understanding the claimed subject matter. However, the order of description should not be construed as to imply that these operations are necessarily order dependent.

FIG. 1 illustrates an example of a burst of transmission from a transmitting device to a receiving device through multiple radio access pathways, in accordance with various embodiments. Diagram 100 shows a transmitter 102 that is to transmit in a burst a plurality of packets 104*a*, . . . , 104*n* associated with a transmission. The packets 104*a*, . . . , 104*n* may travel to a receiver 106 via a plurality of transmission pathways 108, 110, 112.

The transmission pathways 108, 110, 112 may include wired, radio access, laser, or other communication technologies that may be used to transmit the packets 104*a*, . . . , 104*n*. In an example, there may be an LTE path 108 between the transmitter 102 and the receiver 106. In yet another example, there may be a Wi-Fi path 110 that includes wired connection 110*a* to a first wireless access point (WAP) 110*b*, that is in radio communication across a wireless connection 110*c* to a second WAP 110*d*, and finally couples with a wired connection 110*e* to the receiver 106. In another example, a drone 112*b* acting as a new radio (NR) evolved nodeB may be used to transmit a portion of the packets 104*a*, . . . , 104*n* along sub-path 112*a* to sub-path 112*c*. In other embodiments, the transmission pathways 108, 110, 112 may include one or more intermediate paths using various transmission technologies to transmit the packets 104*a*, . . . , 104*n* to the receiver 106.

In embodiments, the transmitter 102 may identify a percentage (or proportion) of the overall number of packets 104*a*, . . . 104*n* to be sent down each of the transmission pathways 108, 110, 112. In embodiments, based on the percentage, the transmitter 102 may include a sequence encoding engine 114 to apply a pseudo-random label assignment to each of the packets 104*a*, . . . , 104*n* that is based in part upon the transmission pathways 108, 110, 112 on which a packet is to travel. In embodiments, a modulation circuit 116 may be coupled with the sequence encoding engine 114 and modulates signals to burst transmit the packets 104*a*, . . . , 104*n* along the transmission pathways

108, 110, 112. In embodiments, the sequence encoding engine 114 and/or modulation circuit 116 may be implemented in hardware, firmware, or as software modules as described in FIG. 5.

In embodiments, the receiver 106 may include a modulation circuit 120 that may be used to receive the modulated signals that represent one or more packets 104a, . . . , 104n. The modulation circuit 120 may be coupled with a sequence decoding engine 118 that may be used to determine the pseudo-random label assignment from each of the packets 104a, . . . , 104n. In embodiments, the determined pseudo-random label assignments may be used to identify a sequencing and the transmission pathways 108, 110, 112 that the packets 104a, . . . , 104n have taken. In embodiments, the sequence decoding engine 118 and/or modulation circuit 120 may be implemented in hardware, firmware, or as software modules as described in FIG. 5.

Figure 2:
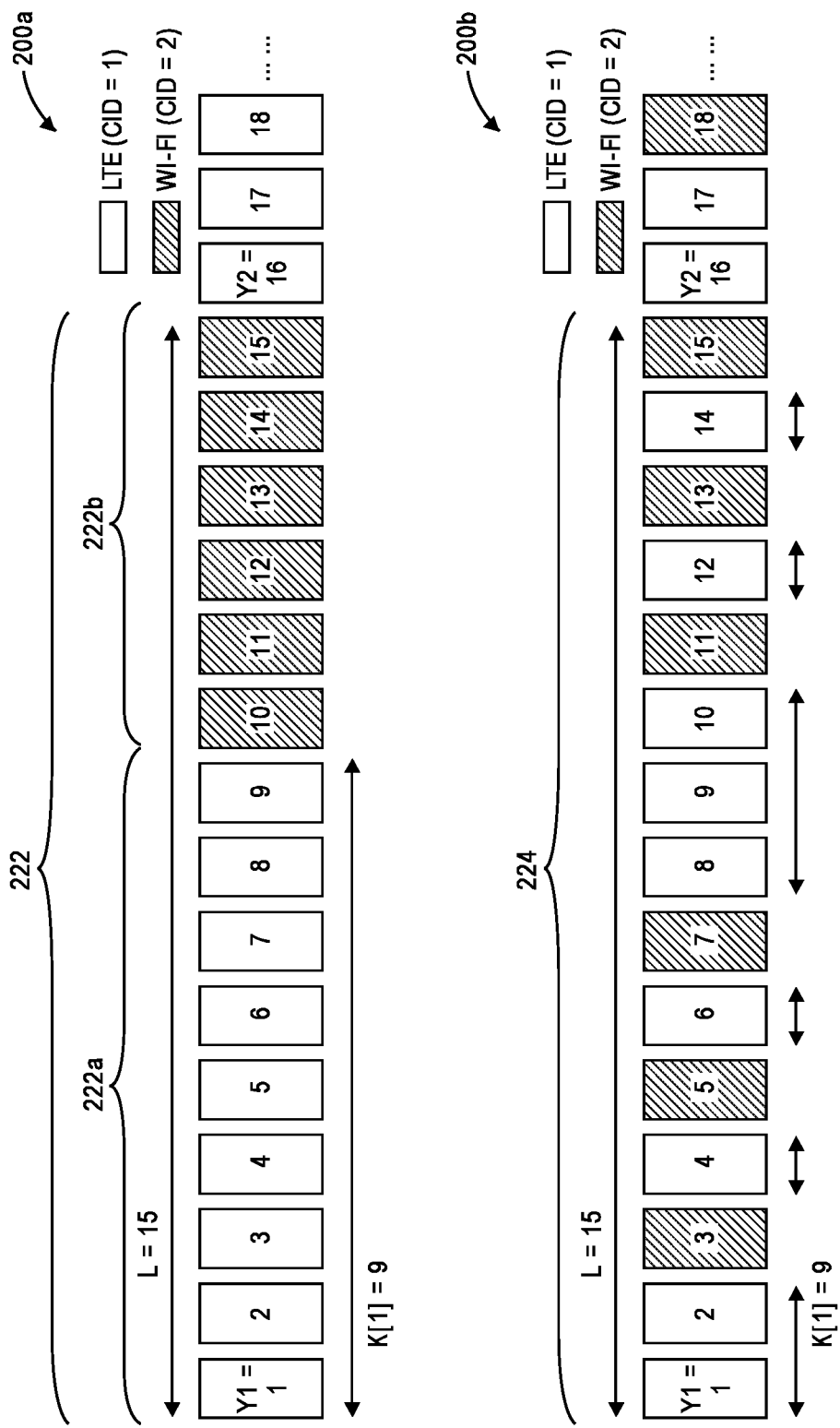
FIG. 2 illustrates example labeling schemes including pseudo-random label assignments for packets in a transmission burst of packets, in accordance with various embodiments.

FIG. 2 illustrates example labeling schemes including pseudo-random label assignments for packets in a transmission burst of packets, in accordance with various embodiments. Diagram 200a shows a legacy implementation used to inform the receiver, such as receiver 106 of FIG. 1, about future packet labels in a transmission burst. In this example, a first burst of 15 packets 222 are to be transmitted along to transmission pathways, in particular a first set of packets 222a along an LTE transmission pathway 108 of FIG. 1, and the second group of packets 222b, along a Wi-Fi transmission pathway 110 of FIG. 1.

In diagram 200a, the labeling scheme may be described as follows:

If $K[i-1] \leq \mathrm{mod}(x-Y,L) < K[i]$, then $s(x)=i, (1 \leq i \leq N)$ where s(x): the identification of the network that packet #x is transmitted over x: the sequence number of the packet Y: the sequence number of the first packet using the configuration L: the traffic splitting burst size N: the number of networks K[i]: the traffic splitting threshold of the network #i (K[0]=0, K[N]=L)

i: the network ID.

In this example, when there are N=2 radio access pathway options to schedule packets, and transmitter has decided to schedule 60% of the packets to LTE and 40% packets to Wi-Fi, the transmitter can choose the burst size L=15 and K[1]=9. The relationship between target splitting ratio for LTE and control parameters (L, K[1]) are given as:

$$SR_1 = \frac{K[1]}{L}.$$

However, before a given packet sequence number, x, the effective splitting ratio observed in the network will be the function of x:

$$SR_1^{\mathit{eff}}(x) = \frac{\lfloor (x-Y)/L \rfloor \times K[1] + \min(K[1], \mathrm{mod}(x-Y, L))}{\lfloor (x-Y)/L \rfloor \times L + \mathrm{mod}(x-Y, L)}.$$

Thus, with $SR_1^{\mathit{eff}}(x) \geq SR_1$ for any x, the equality will hold only when mod(x−Y, L)=0. Thus, the effective splitting ratio will fluctuate from the target configuration in the initial bursts.

Diagram 200b shows an example embodiment of a mapping function from packet sequence number to packet label as follows:

Let n=mod(x−Y, L)+1, 1≤n≤L The representation of n in base B will be given as: $n = \sum_{p=0}^{P-1} d_p(n) B^p$ where P is the total number of B-ary digits and $d_p(n)$ is the $p^{th}$ digit of n. Then L can be chosen as $L = B^P = 1$.

Then the corresponding van der Corput sequence number can be calculated as $$C(n) = \sum_{p=0}^{P-1} d_p(n) B^{P-p} 1$$

The labeling rule may be the following:

If K[i−1]≤C(mod(x−Y,L)+1)−1<K[i], then s(x)=i, (1≤i≤N).

For example, when there are N=2 radio access pathway options to schedule packets, and transmitter has decided to schedule 60% of the packets to LTE and 40% packets to Wi-Fi, then the transmitter can choose the burst size L=15 (B=2, P=4) and K[1]=9. Note, because the base is 2, the scheme can be interpreted as bit-reversal. In that case, the labeling rule will label the packets as shown in packet set 224. As one can see, even though the total number of packets assigned to each label in the burst has not changed, the order of labels in the burst has. Now labels are more uniformly distributed over the burst period, hence the allocation of packets to be transmitted on the 2 radio access pathways (LTE, Wi-Fi) is more balanced.

Figure 3:
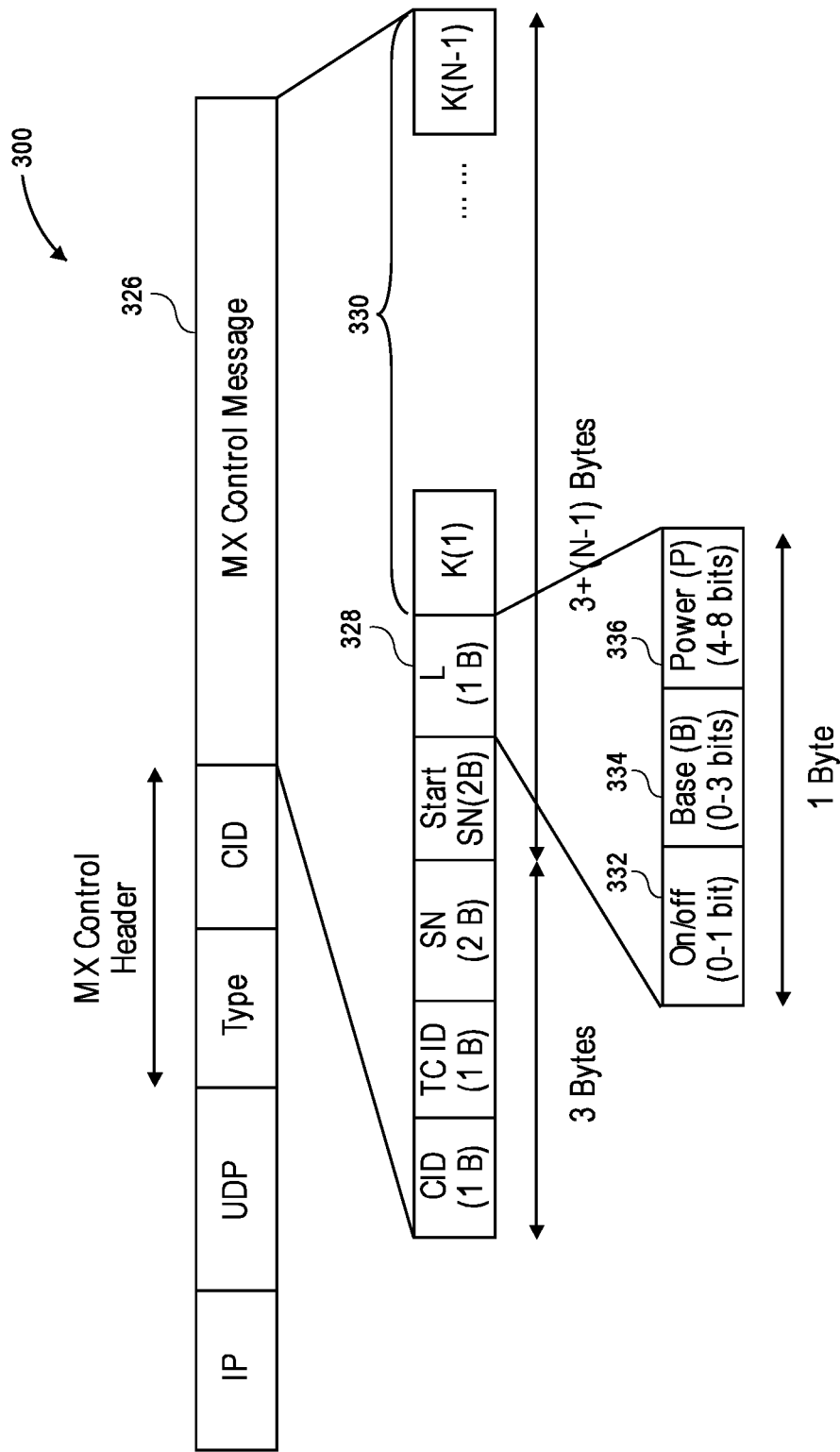
FIG. 3 shows an example message format to support pseudo-random label assignments for packets in a transmission burst of packets, in accordance with various embodiments.

FIG. 3 shows an example message format to support pseudo-random label assignments for packets in a transmission burst of packets, in accordance with various embodiments. Diagram 300 shows an example message format that includes an MX (multi-access) control message 326. The MX control message 326 field may include a 1-byte length field L 328 that may include an on/off indicator 332 field, which may be 0-1 bits, to indicate whether the pseudo-random label scheme is implemented. It may also include a base (B) indicator 334 (described above) field that may be 0-3 bits. It may also include a Power (P) indicator 336 that may be 4-8 bits. In embodiments, if the pseudo-random label assignment scheme is always to be used, the on/off indicator 332 field may be ignored. In embodiments, if there is a default base, then the base indicator field 334 may be ignored. In embodiments, the power indicator field 336 may represent a burst size. In this way, radio access technology scheduling may be informed of the pseudo-random label scheme, flow, sources, and QoS attributes. In embodiments, this information may be communicated in other layers. In embodiments, the MX control message field 326 may also include K(i) values that indicate the traffic splitting threshold of the network as described above.

Figure 4:
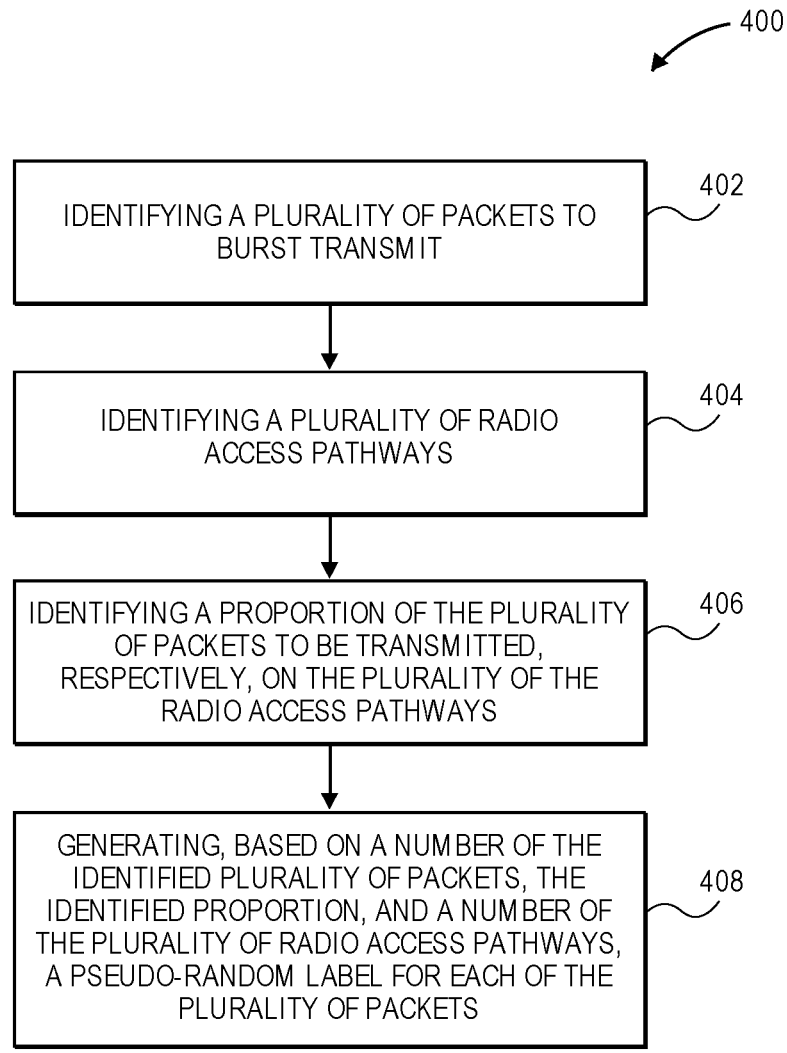
FIG. 4 illustrates an example process for pseudo-random label assignments for packets in a transmission burst, in accordance with various embodiments.

FIG. 4 illustrates an example process for pseudo-random label assignments for packets in a transmission burst, in accordance with various embodiments. The process 400 may be performed, for example, by the device/system 500 of FIG. 5 (e.g., computing device) configured to implement the sequence encoding module 550, described in reference to FIGS. 1-5.

The process 400 may begin at block 402, and may include identifying a plurality of packets to burst transmit. In embodiments, this may include a plurality of packets such as packets 104a, . . . , 104n of FIG. 1, or packets 224 of FIG. 2.

At block 404, the process 400 may include identifying a plurality of radio access pathways. As discussed above, these pathways may include LTE pathway 108, Wi-Fi pathway 110, and/or NR pathway 112 of FIG. 1. In embodiments, other pathways, such as wired pathways, optical pathways, or laser pathways may be identified through which packets may be transmitted.

At block 406, the process 400 may include identifying a proportion of the plurality of packets to be transmitted, respectively, on the plurality of the radio access pathways. In embodiments, this proportion may be selected based upon characteristics of the respective radio access pathways, such as bandwidth, delay, quality, and the like.

At block 408, the process 400 may include generating, based on a number of the identified plurality of packets, the identified proportion, and a number of the plurality of radio access pathways, a pseudo-random label for each of the plurality of packets. In embodiments, the pseudo-random label may be determined as described with respect to FIG. 2. In embodiments, the pseudo-random label for a packet may be used to determine a sequence number of the packet in the plurality of packets, as well as the radio access pathway on which the packet was transmitted.

It should be understood that the actions described in reference to process 400 may not necessarily occur in the described sequence. In addition, some actions may be added or omitted.

Figure 5:
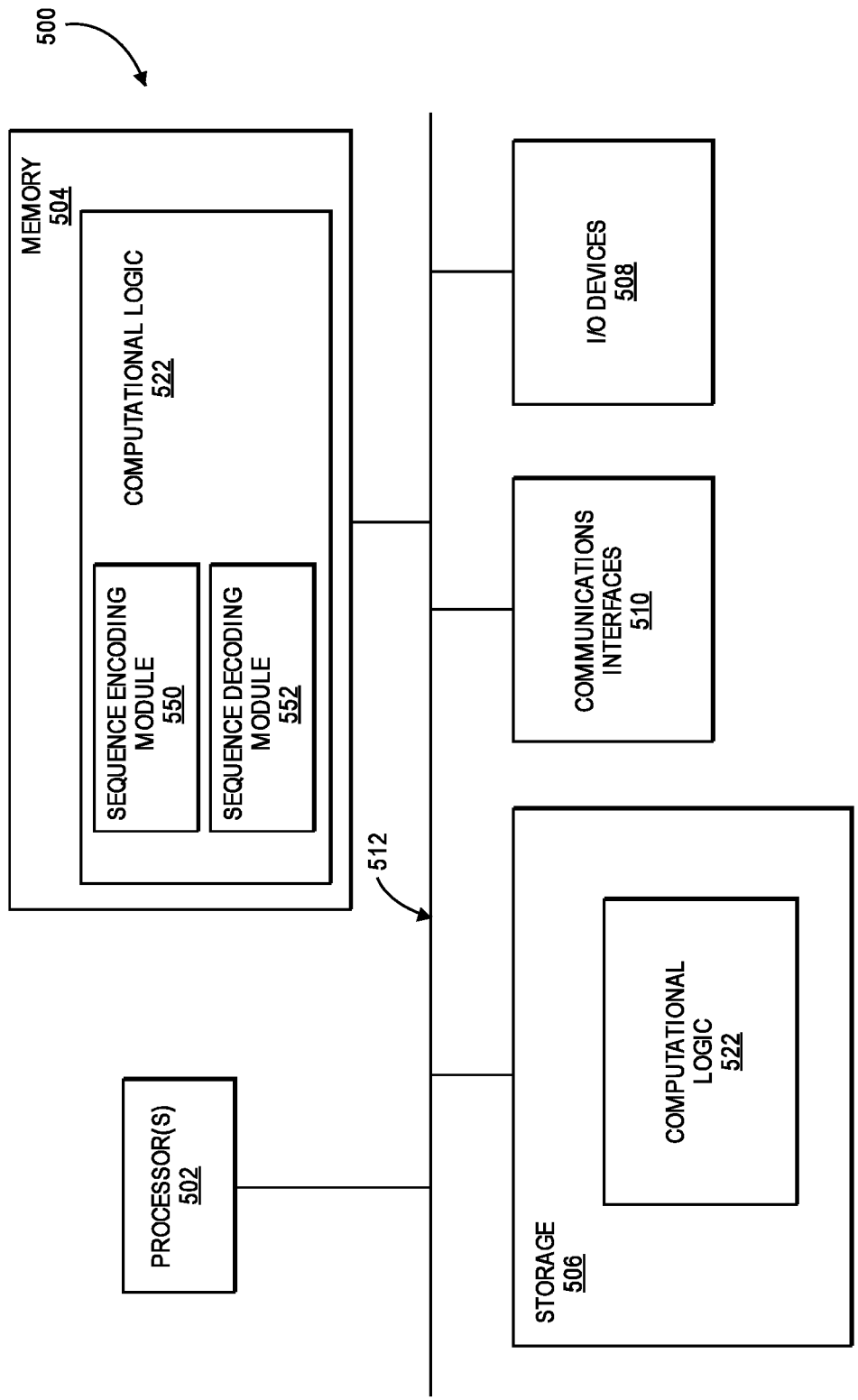
FIG. 5 illustrates a block diagram of an example architecture of a computing/networking device suitable for use to practice the present disclosure, in accordance with various embodiments.

FIG. 5 illustrates a block diagram of an example architecture of a computing/networking device suitable for use to practice the present disclosure, in accordance with various embodiments. As shown, computing device 500 may include one or more processors 502, each having one or more processor cores, and system memory 504. The processor 502 may include any type of unicore or multi-core processors. Each processor core may include a central processing unit (CPU), and one or more level of caches. The processor 502 may be implemented as an integrated circuit. The computing device 500 may include mass storage devices 506 (such as diskette, hard drive, volatile memory (e.g., dynamic random access memory (DRAM)), compact disc read only memory (CD-ROM), digital versatile disk (DVD) and so forth). In general, system memory 504 and/or mass storage devices 506 may be temporal and/or persistent storage of any type, including, but not limited to, volatile and non-volatile memory, optical, magnetic, and/or solid-state mass storage, and so forth. Volatile memory may include, but not be limited to, static and/or dynamic random access memory. Non-volatile memory may include, but not be limited to, electrically erasable programmable read only memory, phase change memory, resistive memory, and so forth.

The computing device 500 may further include input/output (I/O) devices 508 such as a display, keyboard, cursor control, remote control, gaming controller, image capture device, one or more three-dimensional cameras used to capture images, and so forth, and communication interfaces 510 (such as network interface cards, modems, infrared receivers, radio receivers (e.g., Bluetooth), and so forth). I/O devices 508 may be suitable for communicative connections with user devices or other system devices.

The communication interfaces 510 may include communication chips (not shown) that may be configured to operate the device 500 in accordance with a Global System for Mobile Communication (GSM), General Packet Radio Service (GPRS), Universal Mobile Telecommunications System (UMTS), High Speed Packet Access (HSPA), Evolved HSPA (E-HSPA), or Long Term Evolution (LTE) network. The communication chips may also be configured to operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chips may be configured to operate in accordance with Code Division Multiple Access (CDMA), Time Division Multiple Access (TDMA), Digital Enhanced Cordless Telecommunications (DECT), Evolution-Data Optimized (EV-DO), derivatives thereof, as well as any other wireless protocols that are designated as 3G, 4G, 5G, and beyond. The communication interfaces 510 may operate in accordance with other wireless protocols in other embodiments. In some embodiments, communication interfaces 510 when used as user or system devices may include a device necessary for implementing the functionalities of receiving or transmitting bursts of packets at least as discussed with reference to FIG. 4

The above-described computing device 500 elements may be coupled to each other via system bus 512, which may represent one or more buses. In the case of multiple buses, they may be bridged by one or more bus bridges (not shown). Each of these elements may perform its conventional functions known in the art. In particular, system memory 504 and mass storage devices 506 may be employed to store a working copy and a permanent copy of the programming instructions implementing an operating system, one or more applications, and/or aspects of the operations and functionalities associated with FIG. 5, generally shown as computational logic 522. Computational logic 522 may be implemented by assembler instructions supported by processor(s) 502 or high-level languages that may be compiled into such instructions.

In embodiments, the Computational Logic 522 may contain a sequence encoding module 550, which may perform one or more of the packet label encoding functions associated with FIGS. 2-4. Computational Logic 522 may contain a sequence decoding module 552, which may perform one or more of the packet label decoding functions associated with FIG. 2-4.

The permanent copy of the programming instructions may be placed into mass storage devices 506 in the factory, or in the field, though, for example, a distribution medium (not shown), such as a compact disc (CD), or through communication interfaces 510 (from a distribution server (not shown)).

In embodiment, computing device 500 may be a user equipment (UE), an evolved nodeB (eNB), a NR eNB (gNB), a smartphone, a computing tablet, a laptop computer, a desktop computer, a server, a set-top box, a game console, a router, a switch, a gateway, or other networking equipment.

Figure 6:
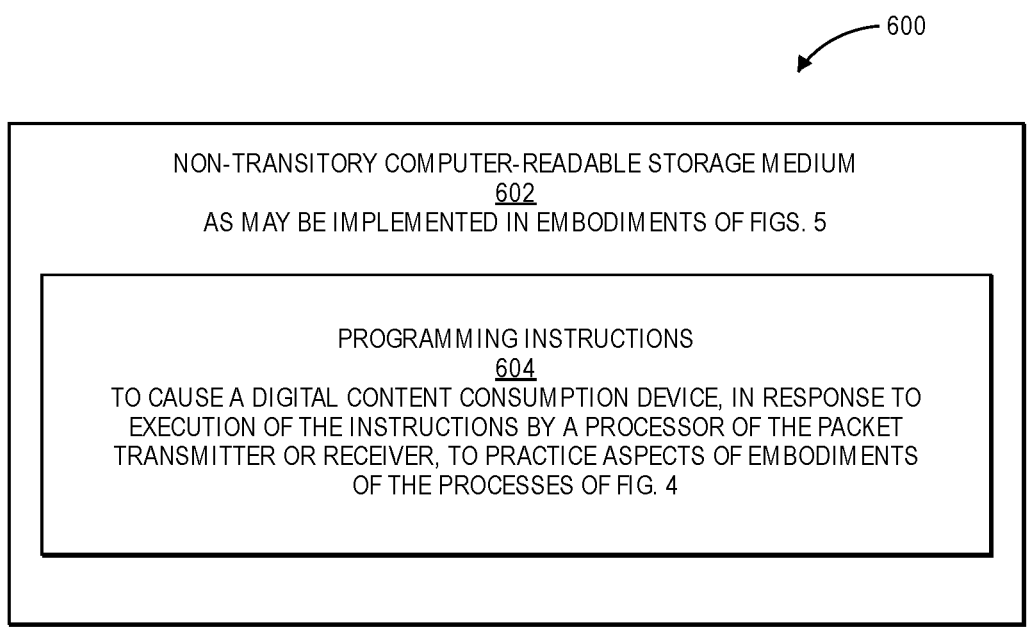
FIG. 6 illustrates an example computer-readable storage medium with instructions configured to enable a computing/networking device to practice aspects of the present disclosure, in accordance with various embodiments.

FIG. 6 illustrates an example computer-readable storage medium with instructions configured to enable a computing/networking device to practice aspects of the present disclosure, in accordance with various embodiments. As illustrated, non-transitory computer-readable storage medium 602 may include a number of programming instructions 604 (e.g., including sequence encoding module 550 and/or sequence decoding module 552). Programming instructions 604 may be configured to enable a device, e.g., computing device 500, in response to execution of the programming instructions, to perform one or more operations of the processes described in reference to FIGS. 1-4. In alternate embodiments, programming instructions 604 may be disposed on multiple non-transitory computer-readable storage media 602 instead. In still other embodiments, programming instructions 604 may be encoded in transitory computer-readable signals.

Referring also to FIG. 5, for some embodiments, processor 502 may be packaged together with a computer-readable storage medium having programming instructions 604 configured to practice all or selected aspects of the hash table insertion and rebalancing related operations earlier described. For one embodiment, processor 502 may be packaged together with a computer-readable storage medium having programming instructions 604 to form a System in Package (SiP). For one embodiment, processor 502 may be integrated on the same die with a computer-readable storage medium having programming instructions 604. For one embodiment, processor 502 may be packaged together with a computer-readable storage medium having programming instructions 604 to form a System on Chip (SoC).

Referring back to FIG. 6, the present disclosure may take the form of a computer program product or data to create the computer program, with the computer program or data embodied in any tangible or non-transitory medium of expression having the computer-usable program code (or data to create the computer program) embodied in the medium. FIG. 6 illustrates an example computer-readable non-transitory storage medium that may be suitable for use to store instructions (or data that creates the instructions) that cause an apparatus, in response to execution of the instructions by the apparatus, to practice selected aspects of the present disclosure. As shown, non-transitory computer-readable storage medium 602 may include a number of programming instructions 604 (or data to create the programming instructions). Programming instructions 604 may be configured to enable a device, e.g., device 500, in response to execution of the programming instructions, to perform, e.g., various programming operations associated with operating system functions, one or more applications, and/or aspects of the present disclosure.

In alternate embodiments, programming instructions 604 (or data to create the instructions) may be disposed on multiple computer-readable non-transitory storage media 602 instead. In alternate embodiments, programming instructions 604 (or data to create the instructions) may be disposed on computer-readable transitory storage media 602, such as, signals. Any combination of one or more computer usable or computer readable medium(s) may be utilized. The computer-usable or computer-readable medium may be, for example but not limited to, one or more electronic, magnetic, optical, electromagnetic, infrared, or semiconductor systems, apparatuses, devices, or propagation media. More specific examples (a non-exhaustive list) of a computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program (or data to create the program) is printed, as the program (or data to create the program) can be electronically captured, via, for instance, optical scanning of the paper or other medium, then compiled, interpreted, or otherwise processed in a suitable manner, if necessary, and then stored in a computer memory (with or without having been staged in or more intermediate storage media). In the context of this document, a computer-usable or computer-readable medium may be any medium that can contain, store, communicate, propagate, or transport the program (or data to create the program) for use by or in connection with the instruction execution system, apparatus, or device. The computer-usable medium may include a propagated data signal with the computer-usable program code (or data to create the program code) embodied therewith, either in baseband or as part of a carrier wave. The computer usable program code (or data to create the program) may be transmitted using any appropriate medium, including but not limited to wireless, wireline, optical fiber cable, RF, etc.

In various embodiments, the program code (or data to create the program code) described herein may be stored in one or more of a compressed format, an encrypted format, a fragmented format, a packaged format, etc. Program code (or data to create the program code) as described herein may require one or more of installation, modification, adaptation, updating, combining, supplementing, configuring, decryption, decompression, unpacking, distribution, reassignment, etc. in order to make them directly readable and/or executable by a computing device and/or other machine. For example, the program code (or data to create the program code) may be stored in multiple parts, which are individually compressed, encrypted, and stored on separate computing devices, wherein the parts when decrypted, decompressed, and combined form a set of executable instructions that implement the program code (the data to create the program code (such as that described herein. In another example, the Program code (or data to create the program code) may be stored in a state in which they may be read by a computer, but require addition of a library (e.g., a dynamic link library), a software development kit (SDK), an application programming interface (API), etc. in order to execute the instructions on a particular computing device or other device. In another example, the Program code (or data to create the program code) may need to be configured (e.g., settings stored, data input, network addresses recorded, etc.) before the program code (or data to create the program code) can be executed/used in whole or in part. Thus, the disclosed Program code (or data to create the program code) are intended to encompass such machine readable instructions and/or program(s) (or data to create such machine readable instruction and/or programs) regardless of the particular format or state of the machine readable instructions and/or program(s) when stored or otherwise at rest or in transit.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The internet of things (IoT) is a concept in which a large number of computing devices are interconnected to each other and to the Internet to provide functionality and data acquisition at very low levels. As used herein, an IoT device may include a semiautonomous device performing a function, such as sensing or control, among others, in communication with other IoT devices and a wider network, such as the Internet. Often, IoT devices are limited in memory, size, or functionality, allowing larger numbers to be deployed for a similar cost to smaller numbers of larger devices. However, an IoT device may be a smart phone, laptop, tablet, or PC, or other larger device. Further, an IoT device may be a virtual device, such as an application on a smart phone or other computing device. IoT devices may include IoT gateways, used to couple IoT devices to other IoT devices and to cloud applications, for data storage, process control, and the like.

Networks of IoT devices may include commercial and home automation devices, such as water distribution systems, electric power distribution systems, pipeline control systems, plant control systems, light switches, thermostats, locks, cameras, alarms, motion sensors, and the like. The IoT devices may be accessible through remote computers, servers, and other systems, for example, to control systems or access data.

The future growth of the Internet may include very large numbers of IoT devices. Accordingly, as described herein, a number of innovations for the future Internet address the need for all these layers to grow unhindered, to discover and make accessible connected resources, and to support the ability to hide and compartmentalize connected resources. Any number of network protocols and communications standards may be used, wherein each protocol and standard is designed to address specific objectives. Further, the protocols are part of the fabric supporting human accessible services that operate regardless of location, time or space. The innovations include service delivery and associated infrastructure, such as hardware and software. The services may be provided in accordance with the Quality of Service (QoS) terms specified in service level and service delivery agreements. The use of IoT devices and networks present a number of new challenges in a heterogeneous network of connectivity comprising a combination of wired and wireless technologies as depicted in FIGS. 7-10.

Figure 7:
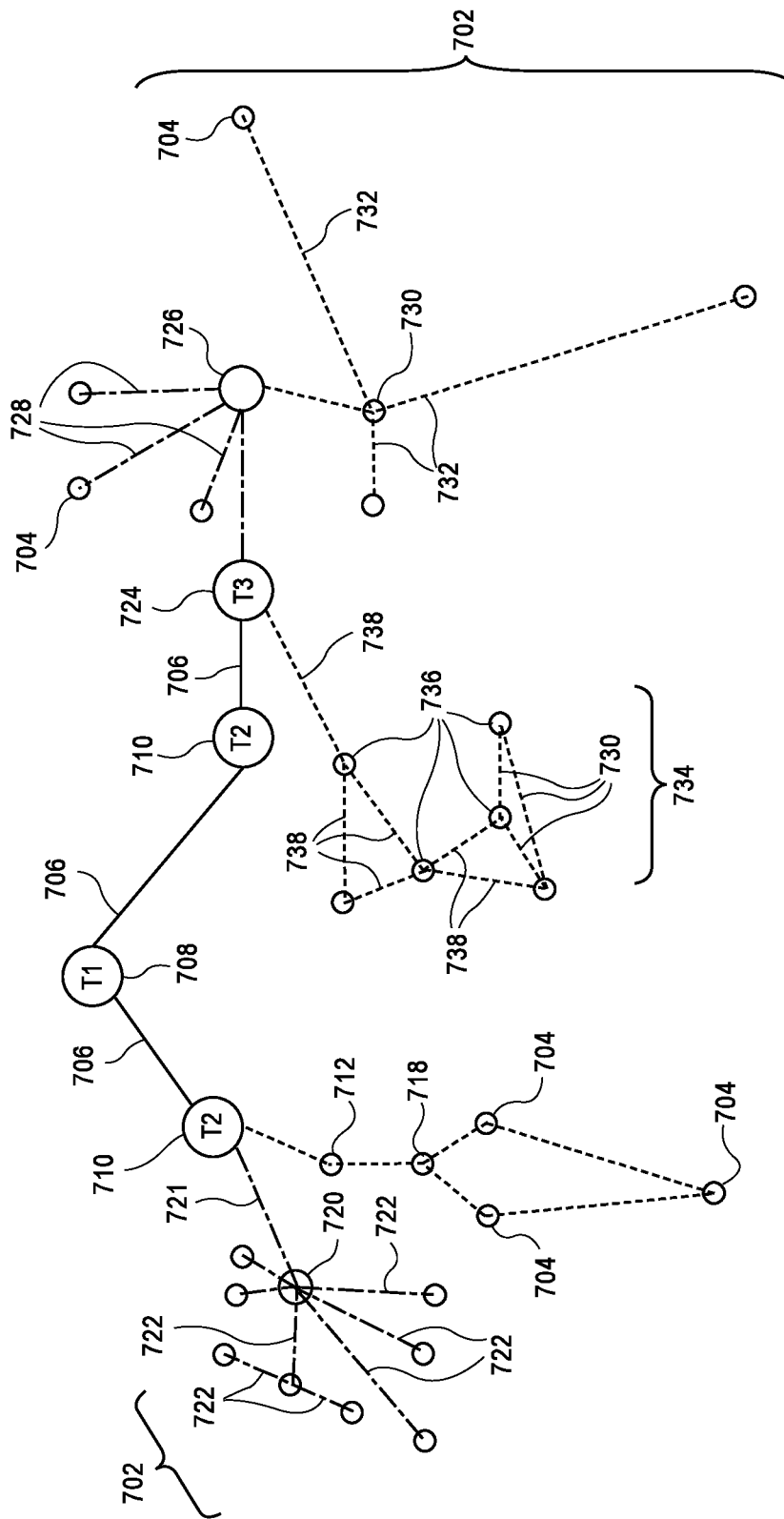
FIG. 7 illustrates an arrangement showing interconnections that may be present between a network and Internet of Things (IoT) networks, in accordance with various embodiments.

FIG. 7 illustrates an arrangement 700 showing interconnections that may be present between the Internet and IoT networks, in accordance with various embodiments. The interconnections may couple smaller networks 702, down to the individual IoT device 704, to the fiber backbone 706 of the Internet 700. To simplify the drawing, not every device 704, or other object, is labeled.

In FIG. 7, top-level providers, which may be termed tier 1 providers 708, are coupled by the fiber backbone of the Internet to other providers, such as secondary or tier 2 providers 710. In one example, a tier 2 provider 710 may couple to a tower 712 of an LTE cellular network, for example, by further fiber links, by microwave communications (not shown), or by other communications technologies. The tower 712 may couple to a mesh network including IoT devices 704 through an LTE communication link (not shown) for example, through a central node 718. The communications between the individual IoT devices 704 may also be based on LTE or NR communication links (not shown) In another example, a high-speed uplink 721 may couple a tier 2 provider 710 to a gateway (GW) 720. A number of IoT devices 704 may communicate with the GW 720, and with each other through the GW 720, for example, over BLE links 722.

The fiber backbone 706 may couple lower levels of service providers to the Internet, such as tier 3 providers 724. A tier 3 provider 724 may be considered a general Internet service provider (ISP), for example, purchasing access to the fiber backbone 706 from a tier 2 provider 710 and providing access to a corporate GW 726 and other customers. From the corporate GW 726, a wireless local area network (WLAN) can be used to communicate with IoT devices 704 through Wi-Fi® links 728. A Wi-Fi link 728 may also be used to couple to a low power wide area (LPWA) GW 730, which can communicate with IoT devices 704 over LPWA links 732, for example, compatible with the LoRaWan specification promulgated by the LoRa alliance.

The tier 3 provider 724 may also provide access to a mesh network 734 through a coordinator device 736 that communicates with the tier 3 provider 724 using any number of communications links, such as an LTE cellular link, an LPWA link, or a link 738 based on the IEEE 802.15.4 standard, such as Zigbee®. Other coordinator devices 736 may provide a chain of links that forms cluster tree of linked devices.

IoT devices 704 may be any object, device, sensor, or "thing" that is embedded with hardware and/or software components that enable the object, device, sensor, or "thing" capable of capturing and/or recording data associated with an event, and capable of communicating such data with one or more other devices over a network with little or no user intervention. For instance, in various embodiments, IoT devices 704 may be abiotic devices such as autonomous sensors, gauges, meters, image capture devices, microphones, machine-type communications (MTC) devices, machine-to-machine (M2M) devices, light emitting devices, audio emitting devices, audio and/or video playback devices, electro-mechanical devices (e.g., switch, actuator, etc.), and the like. In some embodiments, IoT devices 704 may be biotic devices such as monitoring implants, biosensors, biochips, and the like. In other embodiments, an IoT device 704 may be a computer device that is embedded in a computer system and coupled with communications circuitry of the computer system. In such embodiments, the IoT device 704 refer to a system on chip (SoC), a universal integrated circuitry card (UICC), an embedded UICC (eUICC), and the like, and the computer system may be a mobile station (e.g., a smartphone) or user equipment, laptop PC, wearable device (e.g., a smart watch, fitness tracker, etc.), "smart" appliance (e.g., a television, refrigerator, a security system, etc.), and the like.

Each of the IoT devices 704 may include one or more memory devices and one or more processors to capture and store/record data. Each of the IoT devices 704 may include appropriate communications circuitry (e.g., transceiver(s), modem, antenna elements, etc.) to communicate (e.g., transmit and receive) captured and stored/recorded data. Further, each IoT device 704 may include other transceivers for communications using additional protocols and frequencies. The wireless communications protocols may be any suitable set of standardized rules or instructions implemented by the IoT devices 704 to communicate with other devices, including instructions for packetizing/depacketizing data, instructions for modulating/demodulating signals, instructions for implementation of protocols stacks, and the like. For example, IoT devices 704 may include communications circuitry that is configurable to communicate in accordance with one or more person-to-person (P2P) or personal area network (PAN) protocols (e.g., IEEE 802.15.4 based protocols including ZigBee, IPv6 over Low power Wireless Personal Area Networks (6LoWPAN), WirelessHART, MiWi, Thread, etc.; WiFi-direct; Bluetooth/BLE protocols; ANT protocols; Z-Wave; LTE D2D or ProSe; UPnP; and the like); configurable to communicate using one or more LAN and/or WLAN protocols (e.g., Wi-Fi-based protocols or IEEE 802.11 protocols, such as IEEE 802.16 protocols); one or more cellular communications protocols (e.g., LTE/LTE-A, UMTS, GSM, EDGE, Wi-MAX, etc.); and the like. In embodiments, one or more of the IoT devices 704, tower 712, GW 720, 726, and 730, coordinator device 736, and so forth, may also be incorporated with the embodiments described herein, in particular, with references to FIGS. 1-6. In particular, the IoT devices 704, tower 712, GW 720, 726, and 730, coordinator device 736, and so forth, may correspond with the computing devices/systems discussed previously with regard to FIGS. 1-6.

The technologies and networks may enable the exponential growth of devices and networks. As the technologies grow, the network may be developed for self-management, functional evolution, and collaboration, without needing direct human intervention. Thus, the technologies will enable networks to function without centralized controlled systems. The technologies described herein may automate the network management and operation functions beyond current capabilities.

Figure 8:
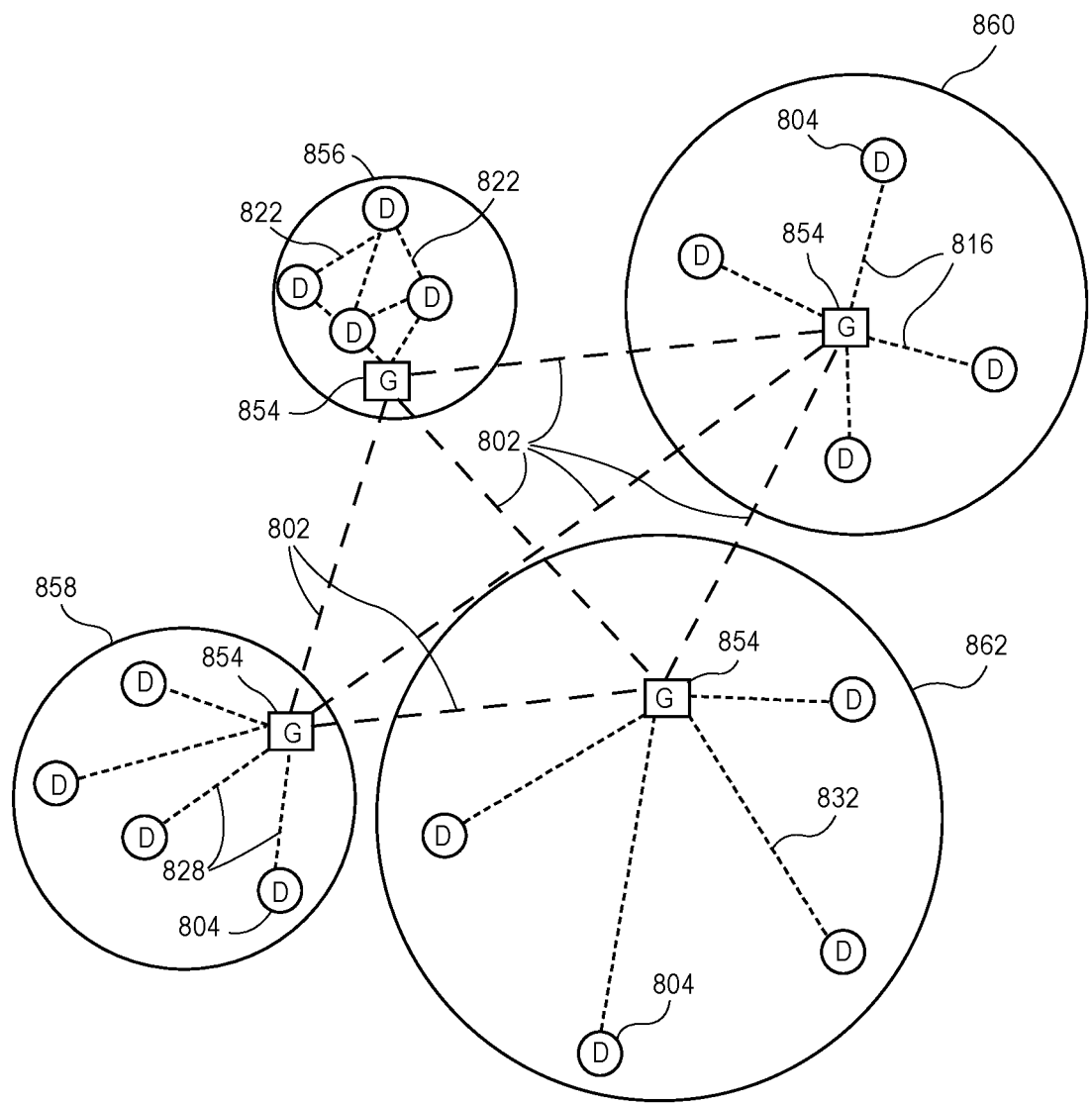
FIG. 8 illustrates an example domain topology, in accordance with various embodiments.

FIG. 8 illustrates an example domain topology 800 that may be used for a number of IoT networks coupled through backbone links 802 to GWs 854, in accordance with various embodiments. To simplify the drawing, not every device 804, or communications link 816, 822, 828, or 832 is labeled. The backbone links 802 may include any number of wired or wireless technologies, and may be part of a local area network (LAN), a wide area network (WAN), or the Internet. Similar to FIG. 7, in embodiments, one or more of IoT devices 804 (which may be the same or similar as IoT devices 804 of FIG. 9), GWs 854, and so forth, may be incorporated with embodiments described herein. In particular, the various devices shown by FIG. 8 may correspond with the EMS appliances, physical nodes, relay controllers, etc., discussed previously with regard to FIGS. 1-6.

The network topology 800 may include any number of types of IoT networks, such as a mesh network 856 using BLE links 822. Other IoT networks that may be present include a WLAN network 858 using WiFi links 828, a cellular network 860 using cellular links 816, and an LPWA network 862 using LPWA links 832. Each of these IoT networks may provide opportunities for new developments, as described herein. For example, communications between IoT devices 804, such as over the backbone links 802, may be protected by a decentralized system for authentication, authorization, and accounting (AAA). In a decentralized AAA system, distributed payment, credit, audit, authorization, and authentication systems may be implemented across interconnected heterogeneous infrastructure. This allows systems and networks to move towards autonomous operations.

In these types of autonomous operations, machines may contract for human resources and negotiate partnerships with other machine networks. This may allow the achievement of mutual objectives and balanced service delivery against outlined, planned service level agreements as well as achieve solutions that provide metering, measurements and traceability and trackability. The creation of new supply chain structures and methods may enable a multitude of services to be created, mined for value, and collapsed without any human involvement.

The IoT networks may be further enhanced by the integration of sensing technologies, such as sound, light, electronic traffic, facial and pattern recognition, smell, vibration, into the autonomous organizations. The integration of sensory systems may allow systematic and autonomous communication and coordination of service delivery against contractual service objectives, orchestration and quality of service (QoS) based swarming and fusion of resources.

The mesh network 856 may be enhanced by systems that perform inline data-to-information transforms. For example, self-forming chains of processing resources comprising a multi-link network may distribute the transformation of raw data to information in an efficient manner, and the ability to differentiate between assets and resources and the associated management of each. Furthermore, the proper components of infrastructure and resource based trust and service indices may be inserted to improve the data integrity, quality, assurance and deliver a metric of data confidence.

The WLAN network 858 uses systems that perform standards conversion to provide multi-standard connectivity, enabling IoT devices 804 using different protocols to communicate. Further systems may provide seamless interconnectivity across a multi-standard infrastructure comprising visible Internet resources and hidden Internet resources. Communications in the cellular network 860 may be enhanced by systems that offload data, extend communications to more remote devices, or both. The LPWA network 862 may include systems that perform non-Internet protocol (IP) to IP interconnections, addressing, and routing.

Figure 9:
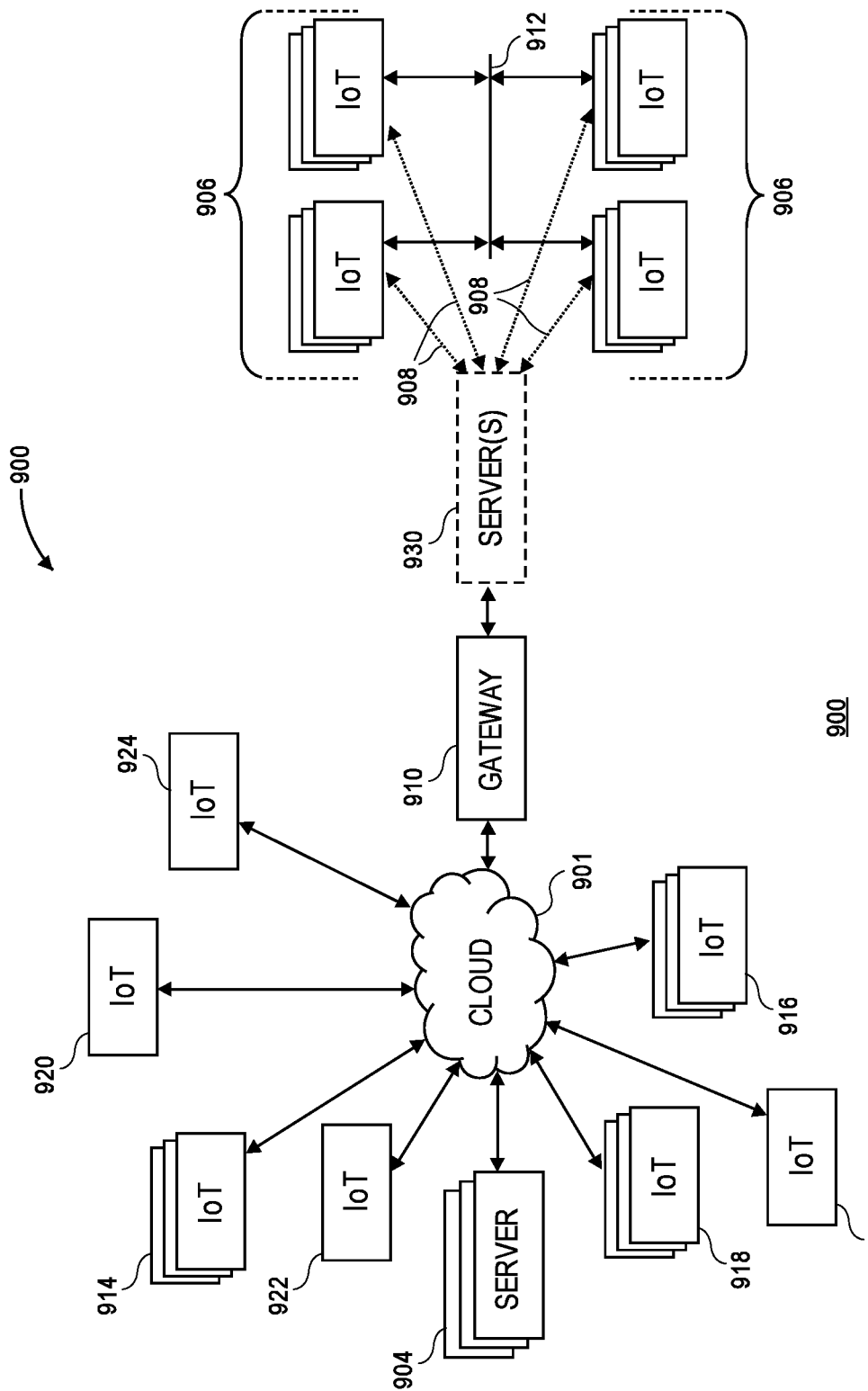
FIG. 9 illustrates an example cloud computing network or cloud in communication with a number of IoT devices, in accordance with various embodiments.

FIG. 9 illustrates an arrangement 900 of example cloud computing network, or cloud 901, in communication with a number of Internet of Things (IoT) devices, in accordance with various embodiments. The cloud 901 may represent the Internet, one or more cellular networks, a local area network (LAN) or a wide area network (WAN) including proprietary and/or enterprise networks for a company or organization, or combinations thereof. Components used for such communications system can depend at least in part upon the type of network and/or environment selected. Protocols and components for communicating via such networks are well known and will not be discussed herein in detail. However, it should be appreciated that cloud 901 may be associated with network operator who owns or controls equipment and other elements necessary to provide network-related services, such as one or more base stations or access points, and one or more servers for routing digital data or telephone calls (for example, a core network or backbone network).

The IoT devices in FIG. 9 may be the same or similar to the IoT devices 704 discussed with regard to FIGS. 7-8. In particular, the IoT devices in FIG. 9 may correspond with the EMS appliances, physical nodes, relay controllers, etc., discussed previously with regard to FIGS. 1-6. The IoT devices may include any number of different types of devices, grouped in various combinations, such as IoT group 906 that may include IoT devices that provide one or more services for a particular user, customer, organizations, etc. A service provider may deploy the IoT devices in the IoT group 906 to a particular area (e.g., a geolocation, building, etc.) in order to provide the one or more services. In one example, the IoT group 906 may be a traffic control group where the IoT devices in the IoT group 906 may include stoplights, traffic flow monitors, cameras, weather sensors, and the like, to provide traffic control and traffic analytics services for a particular municipality or other like entity. Similar to FIGS. 7-8, in embodiments, one or more of IoT devices 914-924, GW 910, and so forth, may be incorporated with the various embodiments described herein, in particular, with references to FIGS. 1-6. For example, in some embodiments, the IoT group 906, or any of the IoT groups discussed herein, may include the components, devices, systems discussed with regard to FIGS. 1-6.

The IoT group 906, or other subgroups, may be in communication with the cloud 901 through wireless links 908, such as LPWA links, and the like. Further, a wired or wireless sub-network 912 may allow the IoT devices to communicate with each other, such as through a local area network, a wireless local area network, and the like. The IoT devices may use another device, such as a GW 910 to communicate with the cloud 901. Other groups of IoT devices may include remote weather stations 914, local information terminals 916, alarm systems 918, automated teller machines 920, alarm panels 922, or moving vehicles, such as emergency vehicles 924 or other vehicles 926, among many others. Each of these IoT devices may be in communication with other IoT devices, with servers 904, or both. In some embodiments, the servers 904 correspond with the transmitter 102 or receiver 106 devices discussed previously.

As can be seen from FIG. 9, a large number of IoT devices may be communicating through the cloud 901. This may allow different IoT devices to request or provide information to other devices autonomously. For example, the IoT group 906 may request a current weather forecast from a group of remote weather stations 914, which may provide the forecast without human intervention. Further, an emergency vehicle 924 may be alerted by an automated teller machine 920 that a burglary is in progress. As the emergency vehicle 924 proceeds towards the automated teller machine 920, it may access the traffic control group 906 to request clearance to the location, for example, by lights turning red to block cross traffic at an intersection in sufficient time for the emergency vehicle 924 to have unimpeded access to the intersection.

In another example, the IoT group 906 may be an industrial control group (also referred to as a "connected factory", an "industry 4.0" group, and the like) where the IoT devices in the IoT group 906 may include machines or appliances with embedded IoT devices, radiofrequency identification (RFID) readers, cameras, client computer devices within a manufacturing plant, and the like, to provide production control, self-optimized or decentralized task management services, analytics services, etc. for a particular manufacturer or factory operator. In this example, the IoT group 906 may communicate with the servers 904 via GW 910, server(s) 930, and cloud 901 to provide captured data, which may be used to provide performance monitoring and analytics to the manufacturer or factory operator. Additionally, where the GW 910 or one or more of the server(s) 930 is or includes an EMS 100/300 (or is an EMS appliance 700 of FIG. 7), the IoT group 906 may communicate with the GW 910 and/or one or more of the server(s) 930 for energy and electricity consumption optimizations according to the various embodiments discussed herein. Furthermore, the IoT devices in the IoT group 906 may communicate among each other, and/or with other IoT devices of other IoT groups, to make decisions on their own and to perform their tasks as autonomously as possible.

Clusters of IoT devices, such as the IoT groups depicted by FIG. 9, may be equipped to communicate with other IoT devices as well as with the cloud 901. This may allow the IoT devices to form an ad-hoc network between the devices, allowing them to function as a single device, which may be termed a fog device. This is discussed further with respect to FIG. 10.

Figure 10:
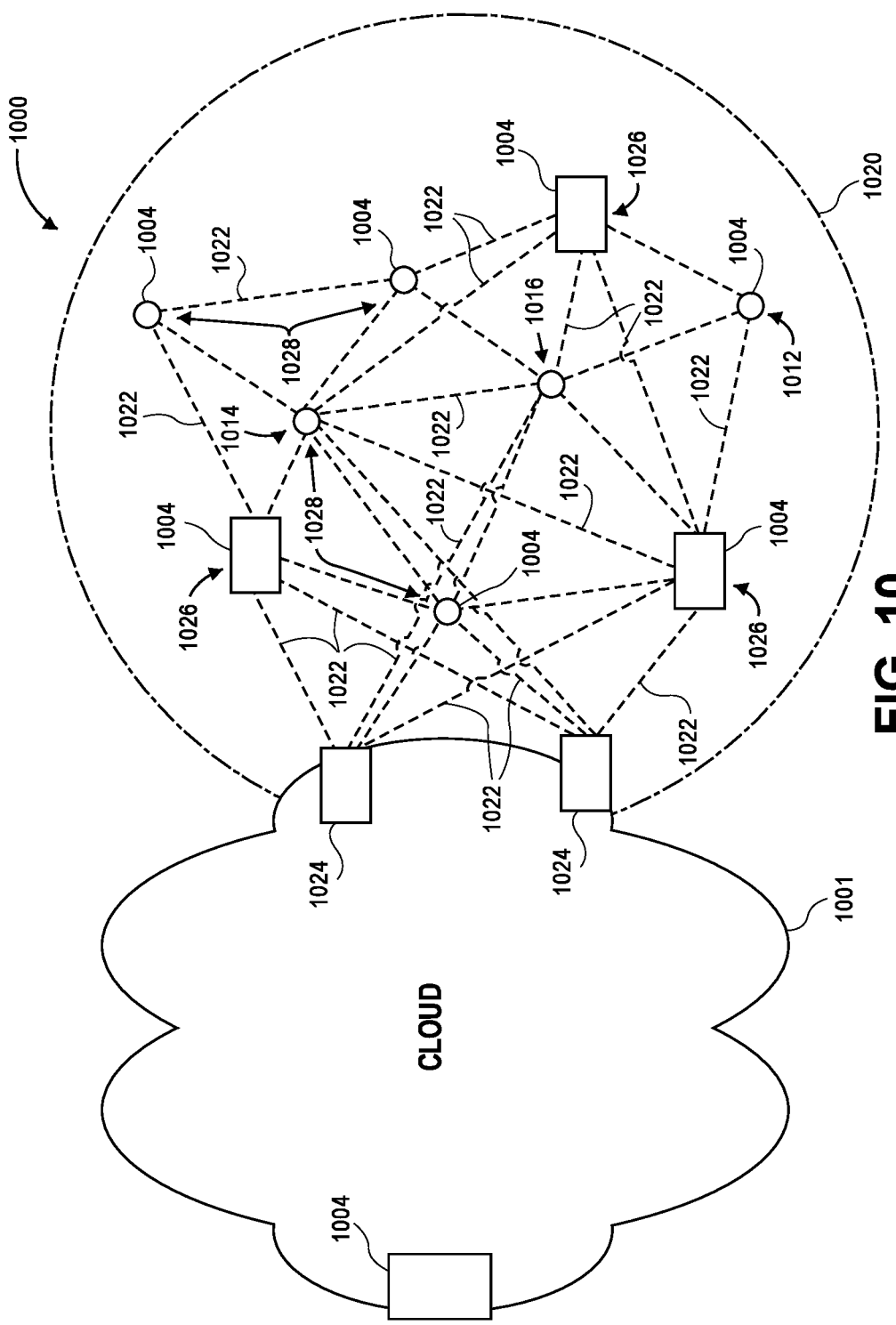
FIG. 10 illustrates an arrangement of a cloud computing network or cloud in communication with a mesh network of IoT devices or IoT fog, in accordance with various embodiments.

FIG. 10 illustrates an arrangement 1000 of a cloud computing network, or cloud 1001, in communication with a mesh network of IoT devices, which may be termed a fog device 1020 or fog 1020, operating at the edge of the cloud 1001, in accordance with various embodiments. Cloud 1001 may be the same or similar to cloud 901 of FIG. 9. In this example, the fog 1020 is a group of IoT devices at an intersection (e.g., and may include one or more IoT groups 906 of FIG. 9). The fog 1020 may be established in accordance with specifications released by the OpenFog Consortium (OFC), the Open Connectivity Foundation™ (OCF), among others. In some embodiments, the fog 1020 may be a tangle as defined by the IOTA Foundation. Additionally, each of the IoT devices in the fog 1020 may correspond with the EMS appliances, physical nodes, relay controllers, etc., discussed previously with regard to FIGS. 1-6.

In embodiments, fog computing systems, such as fog 1020, may be mechanisms for bringing cloud computing functionality closer to data generators and consumers wherein various network devices run cloud application logic on their native architecture. Fog computing is a system-level horizontal architecture that distributes resources and services of computing, storage, control, and networking anywhere along the continuum from Cloud 1001 to Things (e.g., IoT devices 1004).

Fog computing systems may be used to perform low-latency computation/aggregation on the data while routing it to an edge cloud computing service and/or a central cloud computing service for performing heavy computations or computationally burdensome tasks. On the other hand, edge cloud computing consolidates human-operated, voluntary resources, as a cloud. These voluntary resource may include, inter-alia, desktop PCs, tablets, smartphones, nano-data centers, and the like. In various implementations, resources in the edge cloud may be in one to two-hop proximity to the IoT devices 1004, which may result in reducing overhead related to processing data and may reduce network delay.

In some embodiments, the fog 1020 may be a consolidation of IoT devices 1004 and/or networking devices, such as routers and switches, with high computing capabilities and the ability to run cloud application logic on their native architecture. Fog resources may be manufactured, managed, and deployed by cloud vendors, and may be interconnected with high speed, reliable links. Moreover, fog resources reside farther from the edge of the network when compared to edge systems but closer than a central cloud infrastructure. Fog devices are used to effectively handle computationally intensive tasks offloaded by edge resources.

In embodiments, the fog 1020 may operate at the edge of the cloud 1001. The fog 1020 operating at the edge of the cloud 1001 may overlap or be subsumed into an edge network of the cloud 1001. The edge network of the cloud 1001 may overlap with the fog 1020, or become a part of the fog 1020. Furthermore, the fog 1020 may be an edge-fog network that includes an edge layer and a fog layer. The edge layer of the edge-fog network includes a collection of loosely coupled, voluntary and human-operated resources (e.g., the aforementioned edge devices). The Fog layer resides on top of the edge layer and is a consolidation of networking devices such as the transmitter 102 and/or receiver 106 of FIG. 1.

Data may be captured, stored/recorded, and communicated among the IoT devices 1004. Analysis of the traffic flow and control schemes may be implemented by aggregators 1026 that are in communication with the IoT devices 1004 and each other through a mesh network. The aggregators 1026 may be a type of IoT device 1004 and/or network appliance. Data may be uploaded to the cloud 1001 (e.g., transmission pathways 108, 110, 112 of FIG. 1) via the aggregator, and commands can be received from the cloud 1001 through GWs 1024 that are in communication with the IoT devices 1004 and the aggregators 1026 through the mesh network. Unlike the traditional cloud computing model, in some implementations, the cloud 1001 may have little or no computational capabilities and only serves as a repository for archiving data recorded and processed by the fog 1020. In these implementations, the cloud 1001 centralized data storage system and provides reliability and access to data by the computing resources in the fog 1020 and/or edge devices. Being at the core of the architecture, the Data Store of the cloud 1001 is accessible by both Edge and Fog layers of the aforementioned edge-fog network.

Similar to FIGS. 7-9, in embodiments, one or more of IoT devices 1004, aggregators 1026, and so forth, may be incorporated with the various embodiments described herein, in particular, with references to FIGS. 1-6. For example, transmission pathways 108, 110, 112 of FIG. 1 may allow packets 104a, . . . , 104n to be transmitted.

Any number of communications links may be used in the fog 1020. Shorter-range links 1022, for example, compatible with IEEE 802.12.4 may provide local communications between IoT devices that are proximate to one another or other devices. Longer-range links 1022, for example, compatible with LPWA standards, may provide communications between the IoT devices and the GWs 1024. To simplify the diagram, not every communications link 1222 is labeled with a reference number.

The fog 1020 may be considered to be a massively interconnected network wherein a number of IoT devices are in communications with each other, for example, by the communication links 1022. The network may be established using the open interconnect consortium (OIC) standard specification 1.0 released by the Open Connectivity Foundation™ (OCF) on Dec. 23, 2015. This standard allows devices to discover each other and establish communications for interconnects. Other interconnection protocols may also be used, including, for example, the AllJoyn protocol from the AllSeen Alliance, the optimized link state routing (OLSR) Protocol, or the better approach to mobile ad-hoc networking (B.A.T.M.A.N), among many others.

Communications from any IoT device may be passed along the most convenient path between any of the IoT devices to reach the GWs 1024. In these networks, the number of interconnections may provide substantial redundancy, allowing communications to be maintained, even with the loss of a number of IoT devices.

Not all of the IoT devices may be permanent members of the fog 1020. In the example of FIG. 10, three transient IoT devices have joined the fog 1020, a first mobile device 1012, a second mobile device 1014, and a third mobile device 1016. The fog 1020 may be presented to clients in the cloud 1001, such as a server, as a single device located at the edge of the cloud 1001. In this example, the control communications to specific resources in the fog 1020 may occur without identifying any specific IoT device 1004 within the fog 1020. Accordingly, if any IoT device 1004 fails, other IoT devices 1004 may be able to discover and control a resource. For example, the IoT devices 1004 may be wired so as to allow any one of the IoT devices 1004 to control measurements, inputs, outputs, etc., for the other IoT devices 1004. The aggregators 1026 may also provide redundancy in the control of the IoT devices 1004 and other functions of the fog 1020.

In some examples, the IoT devices may be configured using an imperative programming style, e.g., with each IoT device having a specific function and communication partners. However, the IoT devices forming the fog 1020 may be configured in a declarative programming style, allowing the IoT devices to reconfigure their operations and communications, such as to determine needed resources in response to conditions, queries, and device failures. This may be performed as transient IoT devices, such as the mobile devices 1012, 1014, 1016, join the fog 1020. As transient or mobile IoT devices enter or leave the fog 1020, the fog 1020 may reconfigure itself to include those devices. This may be performed by forming a temporary group of the mobile devices 1012 and 1014 and the third mobile device 1016 to control or otherwise communicate with the IoT devices 1004. If one or both of the devices 1012, 1014 are autonomous, the temporary group may provide instructions to the devices 1012, 1014. As the transient devices 1012, 1014, and 1016, leave the vicinity of the fog 1020, it may reconfigure itself to eliminate those IoT devices 1004 from the network. The fog 1020 may also divide itself into functional units, such as the IoT devices 1004 and other IoT devices proximate to a particular area or geographic feature, or other IoT devices that perform a particular function. This type of combination may enable the formation of larger IoT constructs using resources from the fog 1020.

As illustrated by the fog 1020, the organic evolution of IoT networks is central to maximizing the utility, availability and resiliency of IoT implementations. Further, the example indicates the usefulness of strategies for improving trust and therefore security. The local identification of devices may be important in implementations, as the decentralization of identity ensures a central authority cannot be exploited to allow impersonation of objects that may exist within the IoT networks. Further, local identification lowers communication overhead and latency.

The corresponding structures, material, acts, and equivalents of all means or steps plus function elements in the claims below are intended to include any structure, material or act for performing the function in combination with other claimed elements are specifically claimed. The description of the present disclosure has been presented for purposes of illustration and description, but is not intended to be exhaustive or limited to the disclosure in the form disclosed. Many modifications and variations will be apparent to those of ordinary skill without departing from the scope and spirit of the disclosure. The embodiment was chosen and described in order to best explain the principles of the disclosure and the practical application, and to enable others of ordinary skill in the art to understand the disclosure for embodiments with various modifications as are suited to the particular use contemplated.

EXAMPLES

Examples, according to various embodiments, may include the following.

Example 1 is an apparatus comprising: a sequence encoding engine to apply pseudo-random label assignments to packets within a single transmission burst; and a modulation circuit coupled to the sequence encoding engine to modulate signals to burst transmit the packets.

Example 2 may include the apparatus of example 1, wherein the sequence encoding engine is arranged to apply the pseudo-random label assignments to the packets within the single transmission burst using a van der Corput sequence.

Example 3 may include the apparatus of example 1, wherein the modulation circuit modulates signals to burst transmit the packets over selected ones of a plurality of radio access pathways, based at least in part on the pseudo-randomly assigned labels of the packets.

Example 4 may include the apparatus of example 3, wherein the sequence encoding engine is arranged to apply the pseudo-random label assignments to the packets within the single transmission burst using a digit-reversed base-N representation of a packet sequence number, wherein N is a number of the selected ones of the plurality of radio access pathways.

Example 5 may include the apparatus of example 3, wherein the radio access pathways include a cellular data path or a Wi-Fi path.

Example 6 is an apparatus comprising: a modulation circuit to receive packets of a burst transmission having pseudo-random label assignments; and a sequence decoding engine coupled to the modulation circuit to decode pseudo-random labels from packets received from the transmission burst.

Example 7 may include the apparatus of example 6, wherein the sequence decoding engine is further to determine, based upon the decoded pseudo-random labels for each received packet of the burst transmission, one of a plurality of radio access pathways over which the packet was transmitted.

Example 8 may include the apparatus of example 7, wherein the sequence decoding packet is further to identify, based upon the decoded pseudo-random labels for each received packet of the burst transmission, whether a packet transmitted over one of the one or more radio access pathways was dropped in transmission.

Example 9 may include the apparatus of example 6, wherein the pseudo-random labels are assigned using a van der Corput sequence or a digit-reversed base-N representation of a packet sequence number, wherein N is a number of the plurality of radio access pathways.

Example 10 is a method comprising: identifying a plurality of packets to burst transmit; identifying a plurality of radio access pathways; identifying a proportion of the plurality of packets to be transmitted, respectively, on the plurality of the radio access pathways; and generating, based on a number of the identified plurality of packets, the identified proportion, and a number of the plurality of radio access pathways, a pseudo-random label for each of the plurality of packets.

Example 11 may include the method of example 10, further comprising transmitting the plurality of packets in a burst.

Example 12 may include the method of example 11, wherein transmitting the plurality of packets in a burst further includes transmitting the plurality of packets on the plurality of the radio access pathways based at least in part on the pseudo-randomly assigned labels of the packets.

Example 13 may include the method of example 10, wherein identifying the proportion further includes identifying the proportion to increase total packet throughput along the plurality of radio access pathways.

Example 14 may include the method of example 10, wherein the pseudo-random label for each of the plurality of packets is based upon a van der Corput sequence.

Example 15 may include the method of example 10, wherein the pseudo-random label a digit-reversed base-N representation of a packet sequence number, wherein N is a number of the plurality of radio access pathways.

Example 16 may include the method of example 10, wherein the radio access pathways include a cellular data path or a Wi-Fi path.

Example 17 is a method comprising: identifying a received plurality of packets from a burst transmission; and decoding, respectively, a label of the received plurality of packets, wherein the label is a pseudo-random label to determine a sequence and a radio access pathway of the packet.

Example 18 may include the method of example 17, wherein the radio access pathway is one of a plurality of radio access pathways.

Example 19 may include the method of example 18, wherein the plurality of radio access pathways include a cellular data path or a Wi-Fi path.

Example 20 may include the method of example 17, wherein the pseudo-random label for each of the plurality of packets is based upon a van der Corput sequence.

Example 21 include the method of example 17, wherein the pseudo-random label for each of the plurality of packets a digit-reversed base-N representation of a packet sequence number, wherein N is a number of the plurality of radio access pathways.

Example 22 may include the method of example 17, further comprising identifying a missing first packet and the first radio access pathway upon which the first packet was to be sent based upon a decoded pseudo-random label of a second received packet.

Example 23 may include the method of example 17, further comprising determining a sequence number of a packet based upon the decoded label of the packet.

Example 24 may include the method of example 17, further comprising receiving a message to indicate a decoding scheme for the plurality of packets in the burst transmission.

Example 25 may include the method of example 24, wherein the message includes an indication of a base number corresponding to a number of radio access pathways over which the plurality of packets may be transmitted.

What is claimed is:

1. An apparatus comprising:
   a sequence encoding engine to apply pseudo-random label assignments to packets within a single transmission burst;
   a modulation circuit coupled to the sequence encoding engine to modulate signals to burst transmit the packets over selected ones of a plurality of radio access pathways, based at least in part on the pseudo-randomly assigned labels of the packets; and
   wherein the sequence encoding engine is arranged to apply the pseudo-random label assignments to the packets within the single transmission burst by applying a function to the packet sequence numbers of the packets.

2. The apparatus of claim 1, wherein the sequence encoding engine is arranged to apply the pseudo-random label assignments to the packets within the single transmission burst using a van der Corput sequence.

3. The apparatus of claim 1, wherein the function uses a digit-reversed base-N representation of a packet sequence number, wherein N is a number of selected ones of the plurality of radio access pathways.

4. The apparatus of claim 1, wherein the radio access pathways include a cellular data path or a Wi-Fi path.

5. An apparatus comprising:
   a modulation circuit to receive packets of a burst transmission having pseudo-random label assignments;
   a sequence decoding engine coupled to the modulation circuit to decode pseudo-random labels from packets received from the transmission burst; and
   wherein the pseudo-random labels are assigned using a function of packet sequence numbers of the packets.

6. The apparatus of claim 5, wherein the sequence decoding engine is further to determine, based upon the decoded pseudo-random labels for each received packet of the burst transmission, one of a plurality of radio access pathways over which the packet was transmitted.

7. The apparatus of claim 6, wherein the sequence decoding engine is further to identify, based upon the decoded pseudo-random labels for each received packet of the burst transmission, whether a packet transmitted over one of the plurality of radio access pathways was dropped in transmission.

8. The apparatus of claim 5, wherein the function is a van der Corput sequence or a digit-reversed base-N representation of a packet sequence number, wherein N is a number of a plurality of radio access pathways.

9. A method comprising:
identifying a plurality of packets to burst transmit;
identifying a plurality of radio access pathways;
identifying a proportion of the plurality of packets to be transmitted, respectively, on the plurality of the radio access pathways;
generating, based on a number of the identified plurality of packets, the identified proportion, and a number of the plurality of radio access pathways, a pseudo-random label for each of the plurality of packets; and
wherein the pseudo-random label is a function of packet sequence numbers of the plurality of packets.

10. The method of claim 9, further comprising transmitting the plurality of packets in a burst.

11. The method of claim 10, wherein transmitting the plurality of packets in a burst further includes transmitting the plurality of packets on the plurality of the radio access pathways based at least in part on the pseudo-randomly assigned labels of the packets.

12. The method of claim 9, wherein identifying the proportion further includes identifying the proportion to increase total packet throughput along the plurality of radio access pathways.

13. The method of claim 9, wherein the pseudo-random label for each of the plurality of packets is based upon a van der Corput sequence.

14. The method of claim 9, wherein the function is a digit-reversed base-N representation of a packet sequence number, wherein N is a number of the plurality of radio access pathways.

15. The method of claim 9, wherein the radio access pathways include a cellular data path or a Wi-Fi path.

16. A method comprising:
identifying a received plurality of packets from a burst transmission;
decoding, respectively, a label of the received plurality of packets, wherein the label is a pseudo-random label to determine a sequence and a radio access pathway of the packet; and
wherein the pseudo-random label for each of the plurality of packets is based on a function of a packet sequence number of the plurality of packets.

17. The method of claim 16, wherein the radio access pathway is one of a plurality of radio access pathways.

18. The method of claim 17, wherein the plurality of radio access pathways include a cellular data path or a Wi-Fi path.

19. The method of claim 16, wherein the pseudo-random label for each of the plurality of packets is based upon a van der Corput sequence.

20. The method of claim 16, wherein the function is a digit-reversed base-N representation of a packet sequence number, wherein N is a number of a plurality of radio access pathways.

21. The method of claim 16, further comprising identifying a missing first packet and the first radio access pathway upon which the first packet was to be sent based upon a decoded pseudo-random label of a second received packet.

22. The method of claim 16, further comprising determining a sequence number of a packet based upon the decoded label of the packet.

23. The method of claim 16, further comprising receiving a message to indicate a decoding scheme for the plurality of packets in the burst transmission.

24. The method of claim 23, wherein the message includes an indication of a base number corresponding to a number of radio access pathways over which the plurality of packets may be transmitted.

* * * * *